United States Patent
Corrado

(10) Patent No.: US 8,763,351 B2
(45) Date of Patent: Jul. 1, 2014

(54) METHOD OF PACKAGING FOR THIN FRAGILE PARTS

(75) Inventor: Christopher Corrado, Hatfield, PA (US)

(73) Assignee: Greene, Tweed Technologies, Inc., Wilmington, DE (US)

( * ) Notice: Subject to any disclaimer, the term of this patent is extended or adjusted under 35 U.S.C. 154(b) by 938 days.

(21) Appl. No.: 12/214,483

(22) Filed: Jun. 19, 2008

(65) Prior Publication Data

US 2009/0011172 A1 Jan. 8, 2009

Related U.S. Application Data

(60) Provisional application No. 60/958,394, filed on Jul. 5, 2007.

(51) Int. Cl.
| | |
|---|---|
| *B65B 11/50* | (2006.01) |
| *B65D 75/30* | (2006.01) |
| *B32B 1/02* | (2006.01) |

(52) U.S. Cl.
CPC ............... *B65B 11/50* (2013.01); *B65D 75/30* (2013.01); *B32B 1/02* (2013.01)
USPC .............................................. 53/463; 53/461

(58) Field of Classification Search
CPC .......... B65D 75/30; B32B 1/02; B65B 11/50; B65B 11/004; B65B 33/02; B65B 25/24; B65B 23/00; B65B 17/00; B65B 15/00; B65B 5/04
USPC ......................... 53/461, 463; 428/76; 156/313
See application file for complete search history.

(56) References Cited

U.S. PATENT DOCUMENTS

| | | | | |
|---|---|---|---|---|
| 2,043,829 | A | * | 6/1936 | Grant et al. ...................... 53/463 |
| 2,115,977 | A | * | 5/1938 | Lowenfels ....................... 53/463 |

(Continued)

FOREIGN PATENT DOCUMENTS

| | | | | |
|---|---|---|---|---|
| EP | 359050 | A1 * | 3/1990 | ............... B65B 11/50 |
| EP | 1361159 | A1 * | 11/2003 | ............... B65B 11/50 |

(Continued)

OTHER PUBLICATIONS

International Search Report and Written Opinion issued on Nov. 27, 2008 in the corresponding International Application No. PCT/US2008/007732.

*Primary Examiner* — Stephen F Gerrity
(74) *Attorney, Agent, or Firm* — Flaster/Greenberg P.C.

(57) ABSTRACT

A method of laminating a part and a laminated packaging part are described herein. The method includes (a) preparing a laminatable assembly, including (i) providing a first sheet of laminatable material having a first surface, a second surface and a peripheral edge; (ii) contacting the second surface of the first sheet of laminatable material with a first surface of a non-stick layer; (iii) placing a part to be packaged on a second surface of the first non-stick layer opposite the first surface of the non-stick layer such that a first surface of the part contacts the second surface of the non-stick layer; (iv) contacting a second surface of the part opposite the first surface of the part with a first surface of a second non-stick layer; and (v) providing a second sheet of laminatable material having a first surface, a second surface and a peripheral edge, such that the peripheral edge of the first sheet of laminatable material is generally aligned with the peripheral edge of the second sheet of laminatable material to form the laminatable assembly having the first sheet and the second sheet of laminatable material as outer surfaces thereof; and (b) laminating the outer peripheral edges of the first and second sheets of laminatable material to form a laminated package enclosing the part.

12 Claims, 4 Drawing Sheets

(56) References Cited

U.S. PATENT DOCUMENTS

| | | | | |
|---|---|---|---|---|
| 2,542,957 A | * | 2/1951 | Adams | 206/63.3 |
| 2,555,033 A | * | 5/1951 | Harris | 426/87 |
| 2,779,681 A | * | 1/1957 | Sell et al. | 53/461 |
| 2,895,270 A | * | 7/1959 | Blaess | 53/463 |
| 2,998,880 A | * | 9/1961 | Ladd | 206/363 |
| 3,026,656 A | * | 3/1962 | Rumsey, Jr. | 53/463 |
| 3,152,694 A | * | 10/1964 | Nashed et al. | 206/440 |
| 3,189,174 A | * | 6/1965 | Cormack | 206/63.3 |
| 3,301,392 A | * | 1/1967 | Regan, Jr. | 206/363 |
| 3,314,211 A | * | 4/1967 | Wolff | 53/461 |
| 3,403,776 A | * | 10/1968 | Denny | 206/363 |
| 3,613,879 A | * | 10/1971 | Kemble | 206/210 |
| 3,619,215 A | * | 11/1971 | Bard et al. | 426/113 |
| 3,784,212 A | * | 1/1974 | Doerfling | 277/592 |
| 4,069,348 A | * | 1/1978 | Bush | 426/119 |
| 4,279,344 A | | 7/1981 | Holloway, Jr. | |
| 4,620,633 A | * | 11/1986 | Lookholder | 206/523 |
| 4,714,595 A | * | 12/1987 | Anthony et al. | 422/294 |
| 5,115,624 A | * | 5/1992 | Garwood | 53/427 |
| 5,129,512 A | * | 7/1992 | Garwood | 206/213.1 |
| 5,181,610 A | * | 1/1993 | Quick et al. | 206/447 |
| 5,257,692 A | * | 11/1993 | Heacox | 206/210 |
| 5,310,197 A | * | 5/1994 | Bruch et al. | 277/601 |
| 6,170,653 B1 | * | 1/2001 | Panzner | 206/210 |
| 6,280,085 B1 | * | 8/2001 | Beer | 383/210 |
| 6,733,885 B2 | * | 5/2004 | Kincart | 428/408 |
| 7,040,485 B2 | * | 5/2006 | Gupta et al. | 206/484.1 |
| 2005/0013951 A1 | * | 1/2005 | Mitchell et al. | 428/34.2 |
| 2005/0179852 A1 | | 8/2005 | Kawai | |
| 2006/0005515 A1 | * | 1/2006 | Lonergan | 53/461 |
| 2008/0276570 A1 | * | 11/2008 | Kuroda et al. | 53/461 |
| 2009/0056280 A1 | * | 3/2009 | Youell et al. | 53/449 |

FOREIGN PATENT DOCUMENTS

| | | |
|---|---|---|
| JP | 61-091559 U | 6/1986 |
| JP | 10-316166 A | 12/1998 |
| JP | 2004-10051 A | 1/2004 |
| JP | 2005-112441 A | 4/2005 |
| JP | 2005-227450 A1 | 8/2005 |

\* cited by examiner

METHOD OF PACKAGING FOR THIN FRAGILE PARTS

CROSS-REFERENCE TO RELATED APPLICATIONS

This application claims the benefit of priority under 35 U.S.C. §119(e) of U.S. Provisional Patent Application No. 60/958,394, filed Jul. 5, 2007, the entire disclosure of which is incorporated herein by reference.

BACKGROUND OF THE INVENTION

1. Field of the Invention

This invention relates to the field of packaging thin parts or items that can be fragile in handling or shipping.

2. Description of Related Art

There are many other types of packaging available in the prior art for shipping thin and/or fragile parts. However, there is still a need in the art for such a packaging method which addresses the need to package very thin and fragile parts that allows for easy, safe shipping of such components and easy retrieval of the parts from the packaging after shipping.

Prior methods either do not provide sufficient structural integrity and/or do not provide the adequate stiffness necessary to achieve protection of the packaged part. Difficulties are also encountered in removing the part from packaging after shipping without damage to the packaged part. In addition, with respect to such parts for use in industries where contamination is an issue, prior art packaging to date does not achieve high purity standards, such as "cleanroom" satisfactory conditions.

In some industries, where thin and/or fragile parts are shipped, damage to the parts being shipped, handled, or retrieved for usage is such a common occurrence that damage rates can be as high as about 75% or more related to the packaging, shipping and handling of the parts. This invention attempts to address this problem by providing a damage-free method of storage, shipping and retrieval of thin and/or fragile parts and components, including thin parts used in semiconductor manufacturing processes.

BRIEF SUMMARY OF THE INVENTION

The invention includes a method of laminating a part, comprising (a) preparing a laminatable assembly, comprising (i) providing a first sheet of laminatable material having a first surface, a second surface and a peripheral edge; (ii) contacting the second surface of the first sheet of laminatable material with a first surface of a non-stick layer; (iii) placing a part to be packaged on a second surface of the first non-stick layer opposite the first surface of the non-stick layer such that a first surface of the part contacts the second surface of the non-stick layer; (iv) contacting a second surface of the part opposite the first surface of the part with a first surface of a second non-stick layer; and (v) providing a second sheet of laminatable material having a first surface, a second surface and a peripheral edge, such that the peripheral edge of the first sheet of laminatable material is generally aligned with the peripheral edge of the second sheet of laminatable material to form the laminatable assembly having the first sheet and the second sheet of laminatable material as outer surfaces thereof; and (b) laminating at least the peripheral edges of the first and second sheets of laminatable material to form a laminated package enclosing the part.

The invention also includes a laminated packaged part, comprising (a) a first and a second sheet of laminated material sealed around at least peripheral edges thereof, each of the first and the second sheet of laminated material having a first surface and a second surface wherein the first surface of the first sheet of laminated material and the second surface of the second sheet of laminated material form outer surfaces of the packaged part; (b) a first non-stick layer having a first surface and a second surface, wherein a first surface of the first non-stick layer is in contact with the second surface of the first sheet of laminated material; (c) a second non-stick layer having a first surface and a second surface, wherein the second surface of the second non-stick layer is in contact with the first surface of the second sheet of laminated material; and (d) a part having a first surface and a second surface, wherein the first surface of the part is in contact with a second surface of the first non-stick layer and the second surface of the part is in contact with the first surface of the second non-stick layer.

Also described herein is a method for transporting a thin, fragile part to minimize damage, comprising (a) preparing a laminated packaging around a thin part at a first location; and (b) transporting the laminated packaging to a second location. In one preferred embodiment, in the method step (a) further comprises (i) preparing a laminatable assembly, comprising providing a first sheet of laminatable material having a first surface, a second surface and a peripheral edge; contacting the second surface of the first sheet of laminatable material with a first surface of a non-stick layer; placing a part to be packaged on a second surface of the first non-stick layer opposite the first surface of the non-stick layer such that a first surface of the part contacts the second surface of the non-stick layer; contacting a second surface of the part opposite the first surface of the part with a first surface of a second non-stick layer; and providing a second sheet of laminatable material having a first surface, a second surface and a peripheral edge, such that the peripheral edge of the first sheet of laminatable material is generally aligned with the peripheral edge of the second sheet of laminatable material to form the laminatable assembly having the first sheet and the second sheet of laminatable material as outer surfaces thereof; and (ii) laminating at least the peripheral edges of the first and second sheets of laminatable material to form a laminated package enclosing the part.

DETAILED DESCRIPTION OF THE SEVERAL VIEWS OF THE DRAWINGS

The foregoing summary, as well as the following detailed description of the embodiments of the invention, will be better understood when read in conjunction with the appended drawings. It should be understood, however, that the invention is not limited to the precise arrangements and instrumentalities shown. In the drawings:

FIG. 7a is a cross-sectional view of the packaging assembly 10 taken along line 7a-7a;

DETAILED DESCRIPTION OF THE INVENTION

Figure 1:
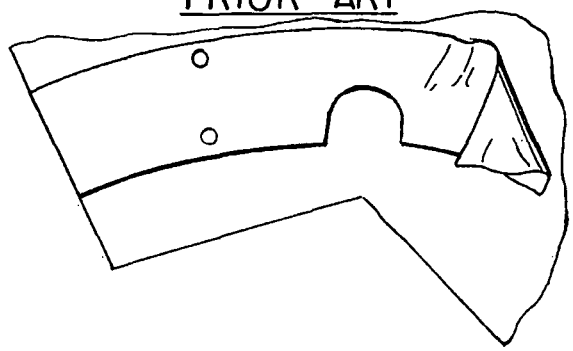
FIG. 1 is a top elevational photographic view of a damaged part after shipment according to a prior art method of shipping thin, fragile parts.
Figure 1A:
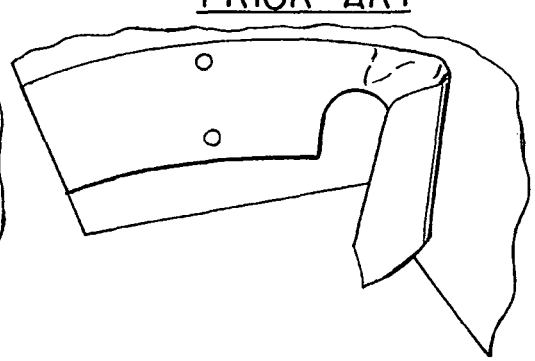
FIG. 1A is a top elevational photographic view of a second damaged part after shipment according to a prior art method of shipping thin, fragile parts.

Being able to package very thin fragile parts of various sizes is critical to the success of the product itself, as manufacturing costs significantly increase due to ever increasing rejection rates due to damaged parts that cannot be used after shipment. The method described herein allows for thin and/or flat parts and/or fragile parts, wherein thin can be as small as, for example, on the order of about 0.001 inch to about 0.030 inch in thickness as measured transversely across the part to be packaged successfully. However, it should be understood that this method can be used on other types of fragile parts when applicable based on size and configuration even if outside the range of thickness or alternative in configuration. However, it is known, in accordance with the preferred embodiment described herein, that parts that are flat and/or thin parts are particularly susceptible to dents, creases, smudges and deformation. Prior art parts, which have been damaged by defective packaging are, shown in FIGS. 1 and 1A. The invention herein allows for such parts to be packaged in a way that would allow general handling, shipping and storage without damage to the part.

Figure 2:
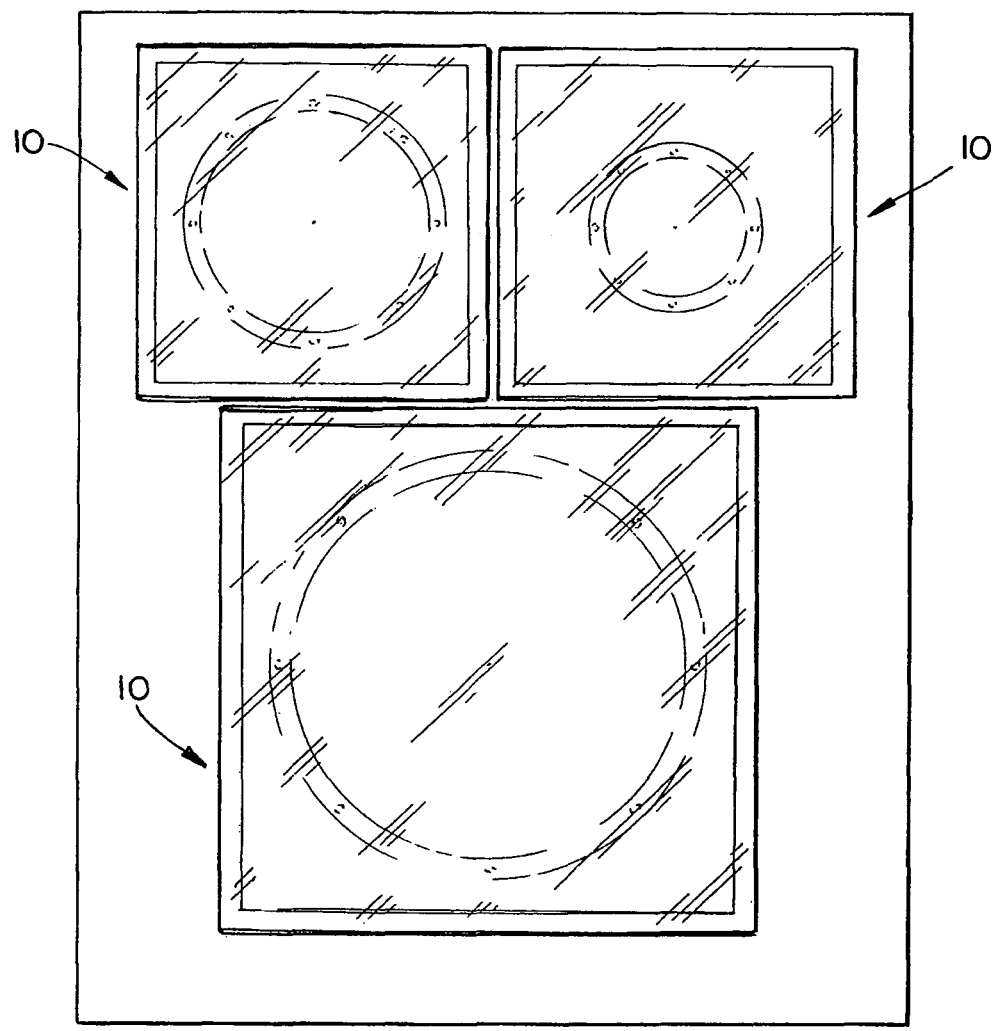
FIG. 2 is a top elevational photographic view of several different thin, fragile parts packaged for shipment according to an embodiment of packaging thin, fragile parts according to the invention.
Figure 9:
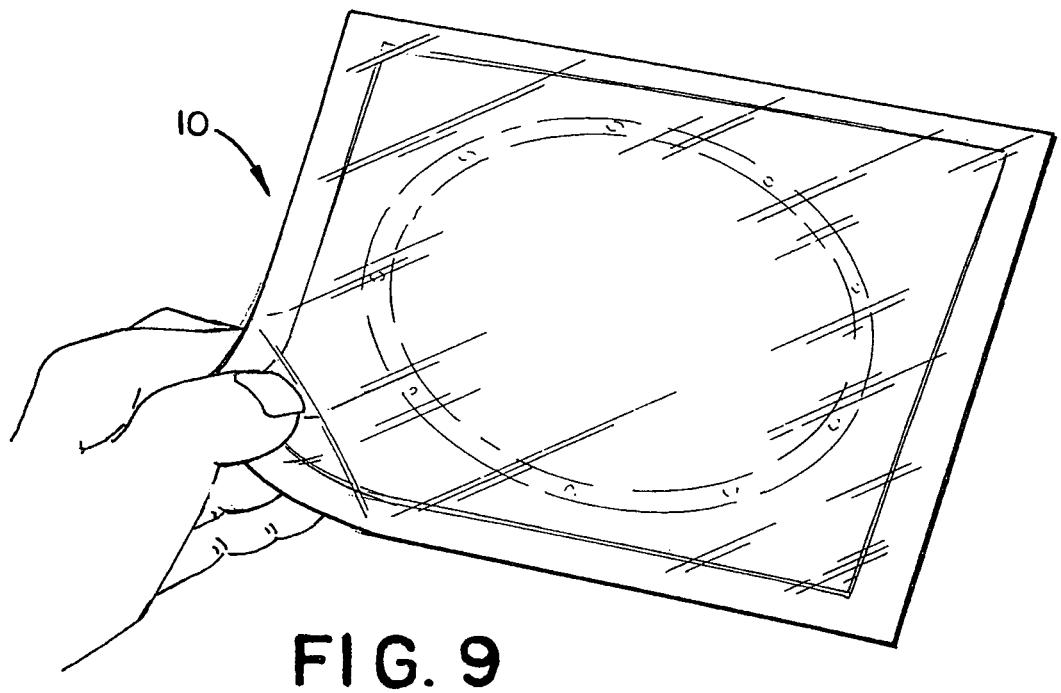
FIG. 9 is a perspective photographic view of a part packaged in accordance with the method described herein showing flexible, protective packaging.
Figure 10:
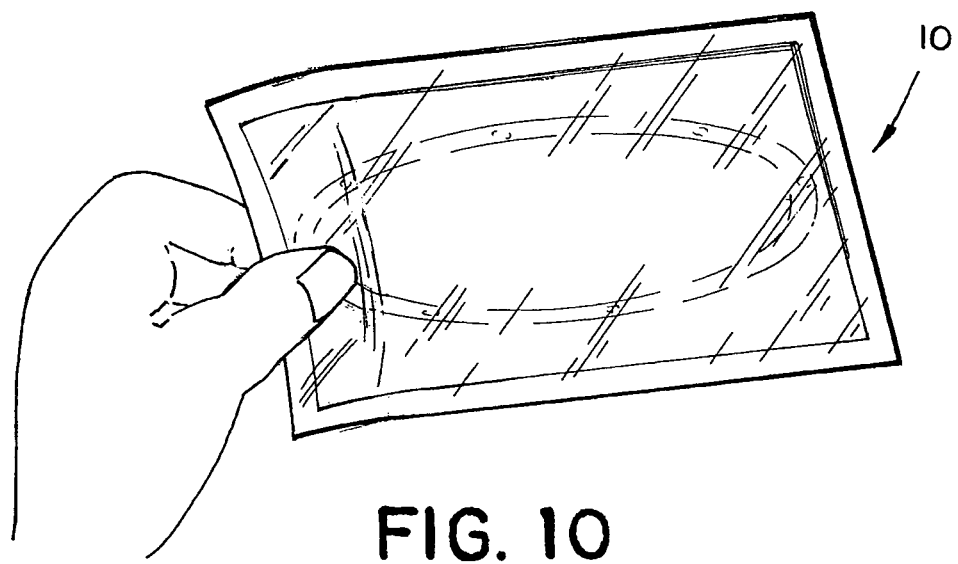
FIG. 10 is a further perspective flexible view of a packaged part showing the thin nature of the packaging.

The packaging method described herein provides a shell of varying rigidity (i.e., it can be rigid or semi-rigid) that can be easily opened and also allows parts to be retrieved with ease. As shown in FIGS. 9 and 10, herein, parts packaged in accordance with the method described herein and included within an assembly such as assembly 10 provide flexible, protective packaging for thin parts having an overall thin packaging configuration. Finished packaging, shown generally as the assembled packaging 10, formed according to the method described herein is shown in FIG. 2. The method uses a thin film or parchment that can be polymer-impregnated, in which case, it is preferably impregnated with a silicon-based or PTFE-based polymer. Preferably, the method uses silicone or similar protection material that provides a non-stick method for packaging a part such that part retrieval is easy.

Figure 3:
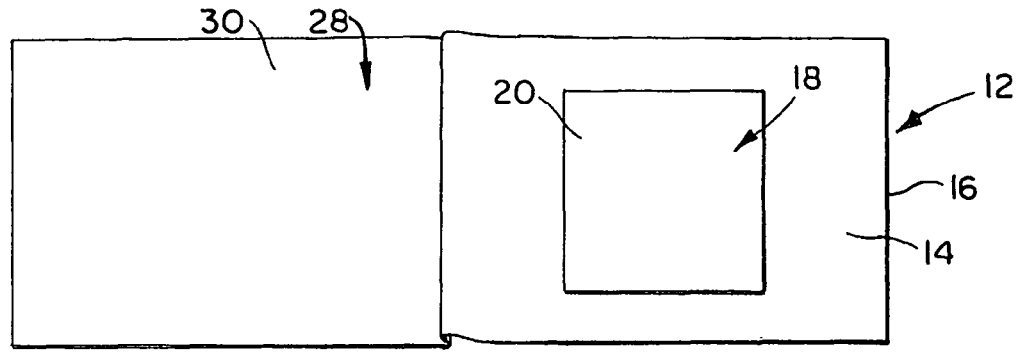
FIG. 3 is top elevational photographic view of a layer of laminate and silicone sheet prepared for receiving a part for lamination according to a first step in an embodiment of a method of packaging according to the invention.
Figure 4:
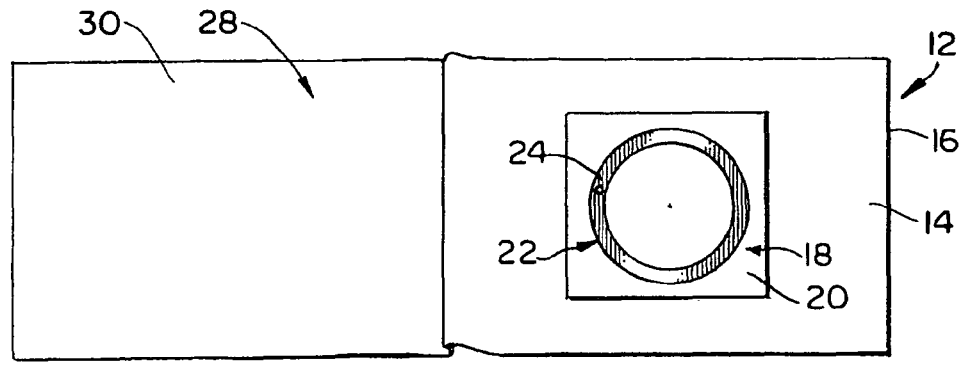
FIG. 4 is top elevational photographic view of a part placed on a silicone sheet prior to lamination according to a second step in an embodiment of a method of packaging according to the invention.
Figure 5:
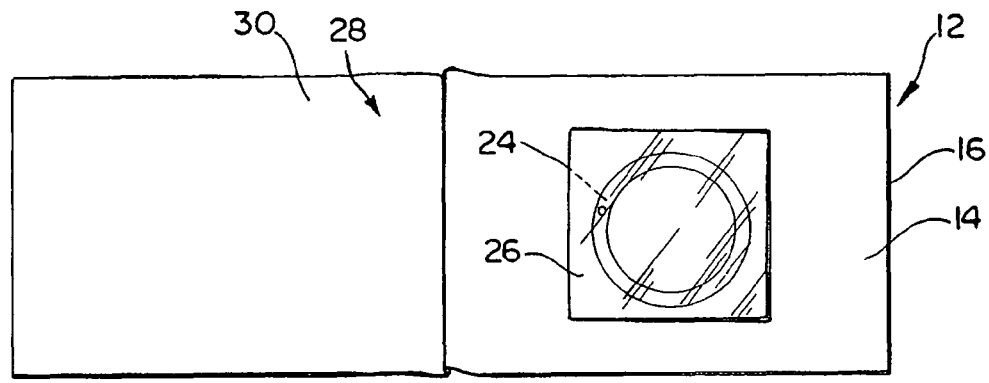
FIG. 5 is a top elevational photographic view of a further silicone sheet overlaid on a part as placed in FIG. 4 according to a third step in an embodiment of a method of packaging according to the invention.
Figure 7:
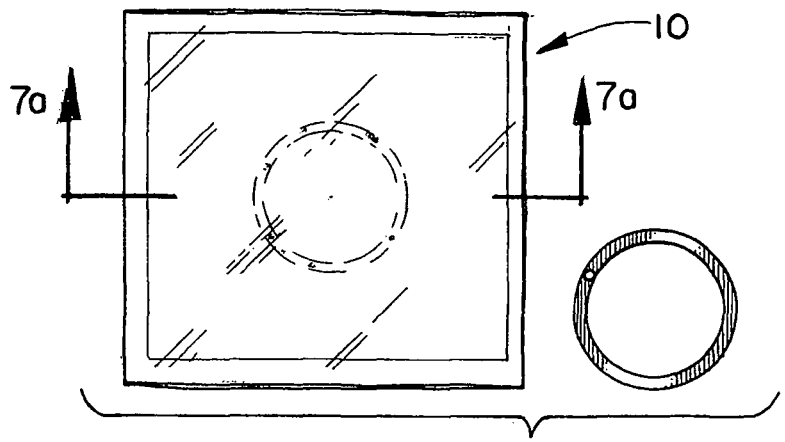
FIG. 7 is a further top elevational photographic view of the assembly of FIG. 6 after heat lamination according to a fifth step in an embodiment of a method of packaging according to the invention having a further part capable of being packaged according to the invention next to the laminated part.
Figure 7A:
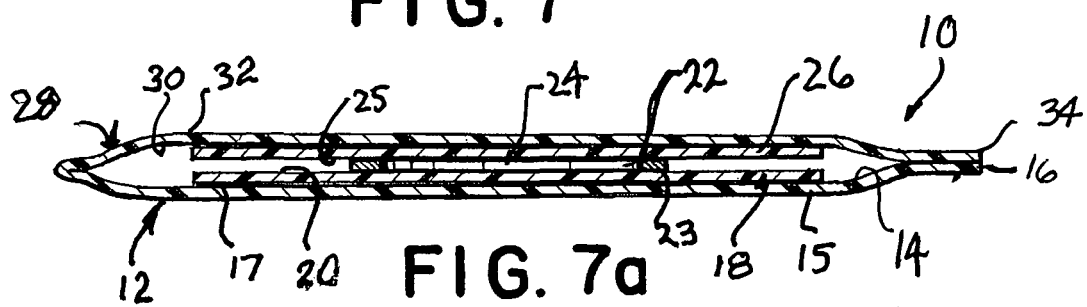

The method as described herein for laminating a part, includes first preparing a laminatable assembly. The assembly, as shown in FIG. 2 and referred to herein generally as 10, is prepared by first providing a first sheet 12 of laminatable material, as shown in FIGS. 3, 4, and 7a having a first surface 15, a second surface 14 and a peripheral edge 16. The second surface 14 of the first laminatable sheet 12 is then contacted with a first surface 17 of a first non-stick layer 18. A part 22 is then placed on the second surface 20 of the first non-stick layer 18 (opposite of the first surface of the non-stick layer) such that a first surface of the part 23 is in contact with the second surface 20 of the non-stick layer 18. A second surface 24 of the part 22 (opposite the first surface of the part) is then contacted with the first surface 25 of a second non-stick layer 26 as shown in FIG. 5.

A second sheet 28 of laminatable material having a first surface 30 (see FIG. 3) and a second surface 32 (see FIG. 6) is then provided such that the peripheral edge 34 of the second sheet 28 is generally aligned, and preferably substantially and more preferably completely aligned with the peripheral edge 16 of the first sheet 12 to form the laminatable assembly 10 wherein the first sheet and the second sheets 12, 28 of laminatable material form the outer surfaces thereof. The first and second sheets 12, 28 are laminated along the outer peripheral edges 16, 34 to form a laminated package 10 enclosing the part.

As shown, the first and second sheets 12, 28 of laminatable material may be two independent sheets or can be pre-joined along at least one edge thereof as shown in FIG. 2 prior to forming the laminatable assembly and simply folded over.

Once prepared as noted herein, a laminated packaged part 10 is formed which includes the first and a second sheet of laminated material 12, 28 sealed around peripheral edges 16, 34 thereof, wherein each of the first and the second sheet of laminated material has a first surface and a second surface as noted hereinabove, and wherein the first surface of the first sheet of laminated material and the second surface of the second sheet of laminated material form outer surfaces of the packaged part 10. As noted elsewhere herein, a first and a second non-stick layers 18, 26 having a first surface and a second surface, are within the structure wherein a first surface of the first non-stick layer 18 is in contact with the second surface of the first sheet 12 of laminated material and the second surface of the second non-stick layer 26 is in contact with the first surface of the second sheet of laminated material 28. A part 22 having a first surface and a second surface 24 is between the non-stick layers 18, 26.

The method includes initially providing a polymeric laminatable material, such as an olefinic (polyolefin, polypropylene, polyethylene, and copolymers and blends thereof) or other similar plastic laminatable material in sheet form as shown in FIG. 3. Other suitable laminate materials include polyesters, polyvinylchlorides, polyamides, fluoropolymers (such as polytetrafluoroethylene (PTFE), and copolymers of tetrafluoroethylene (TFE) with other monomers to form melt processible copolymers such as TFE/hexafluoropropylene, TFE/perfluoroalkylvinyl ether and curable copolymers thereof capable of forming fluoroelastomeric materials, as well as olefinic materials. Such laminatable materials may laminate from heat bond sealing or crimping the peripheral edges using direct thermal bonding, adhesive bonding, heat welding (using an intermediate thermoplastic weld), and similar methods. If an adhesive is incorporated and/or placed on at least the peripheral edges of the laminatable materials, the adhesive may be any known temperature- and/or pressure-sensitive adhesive compatible with the laminatable material and capable of bonding same. While some lamination materials are available with adhesive already on them throughout the entire sheet, the entire sheet need not be bonded, and it is only necessary to bond around at least, at a minimum, around the peripheral edges of the sheets. However, it will be understood that the entire sheets can be bonded in accordance with standard lamination techniques, but the intervening non-stick portions of the laminatable assembly as described elsewhere herein will avoid bonding of anything to the part itself. Thus, the user can determine whether for shipping integrity and/or ease in handling and removal, the laminate in bonded only along the peripheral edges or is bonded along the peripheral edges as well as the entire area of the sheeting.

In addition to the laminatable materials noted above, it is within the scope of the invention to include on the surfaces of the laminatable materials decorative designs and/or labeling for part and/or source identification, patent number identification and the like. Such decorative designs may be included in accordance with any decorative design techniques known or to be developed in the art such as preparing a decorative film laminate sheeting or shrink-wrapping and the like. Labeling can be incorporated in a laminate as well or simply adhered by a pressure- and/or temperature-sensitive adhesive.

The laminatable sheet material is preferably a single piece capable of acting as the front and back face of the finished laminate material. Preferably, the laminatable material is of a thickness sufficient to provide acceptable structural integrity for shipping as a rigid or semi-rigid part, but thin enough to provide economical shipping, visibility of the nature of the part through the laminate. Preferably, the laminatable sheet material is on the order of about 0.001 to about 0.010 inches in transverse sheeting thickness. Most preferably, the laminatable sheet is also transparent or translucent so that the part is visible through the laminate. Thus, a single sheet, capable of being folded over as shown in FIG. 3 may be used or two separate pieces or two separate rolls of laminatable sheeting material may also be used.

Following providing of the polymeric laminatable material, a non-stick polymer-impregnated film or parchment is provided to the laminatable material and situated so that is placed on the laminatable sheet material leaving a border for lamination, and preferably is placed approximate the center of the portion of the sheet that will serve as the front and/or back surface of the finished part as shown in FIG. 3. The non-stick polymer-impregnated film or parchment or other similar non-stick material is preferably in the form of a thin sheet or film, and most preferably is a silicone-impregnated parchment paper. This parchment should be configured so as to be placed to contact on one surface thereof the laminatable sheet material and on the other surface thereof, the part to be packaged. It is also preferred that the parchment material be at least translucent so that the nature of the part can still be visible, however, this is an optional feature.

Figure 8:
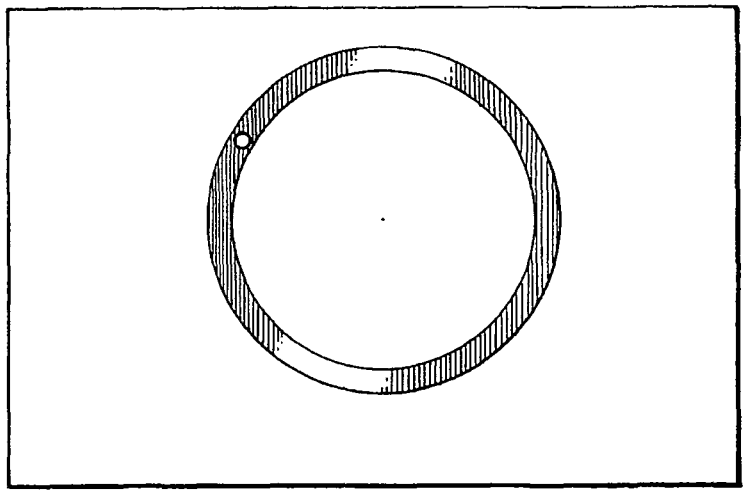
FIG. 8 is a top elevational photographic view of a further part capable of being packaged according to the invention.

The part is then placed on the parchment material as shown in FIG. 4. It should be understood that the part may be a part such as that shown which is a thin gasketing material, but may also be any similar part or fragile and/or thin and/or flat part requiring protective packaging. The part is placed preferably generally centrally on the face of the parchment, which is intended to contact the part (i.e., opposite the side contacting the laminatable sheeting). Then a further piece of parchment is placed on the opposite side of the part, such that a layered structure is created having at least two sheets of parchment with a part therebetween as shown in FIG. 5. The parchment and part layers are placed in a way that leaves an exposed edge of the laminatable sheet material. While the invention is described herein with respect to a preferred embodiment in which only a single part is individually laminated within the structures shown herein, it is within the scope of the invention to include multiple layers of parchment and multiple parts therebetween (i.e., at least a second part and at least a third layer of parchment) within a single lamination such as laminatable sheet/parchment/part/parchment/part/parchment/laminatable sheet and/or to include multiple laminations (i.e., forming at least a second assembly as noted hereinabove, and laminating it to the first assembly) with intersealed laminatable sheets in one multi-laminated pack of multiple layers of laminatable sheet/parchment/part/parchment/laminatable sheet/parchment/part/parchment/laminatable sheet, etc. Thus, after preparing assembly 10, another part as shown in FIGS. 7 and 8 may be further laminated using an alternative assembly as noted herein.

Figure 6:
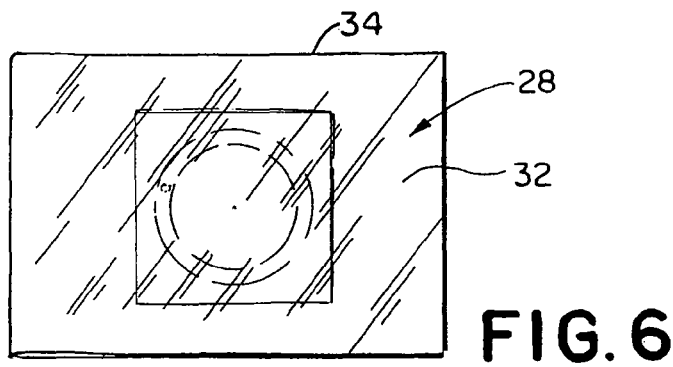
FIG. 6 is a top elevational photographic view of a laminate sheet placed over the further silicone sheet in FIG. 5 according to a fourth step in an embodiment of a method of packaging according to the invention.

In the preferred embodiment, following the enclosure of the part within two sheets of parchment, another second layer of laminatable sheet material is placed on the second parchment layer so as to be on the opposite side of the assembled structure forming the opposite face of the laminate. The second laminatable sheet material is preferably placed so as to be aligned with the first laminatable sheeting material and so that the entire assembled structure, has the parchment layers and part generally centered between the laminatable sheets as shown in FIG. 6.

The entire assembled structure is then placed into a heat bonding or other laminating machines as are known in the art, and the structure is laminated into one integral package. The laminating machine can be set for varying temperatures, depending on the type of laminatable sheet material being used, but is preferably set between about 225° F. and about 275° F.

The finished packaging can then be shipped and handled without damage to the part. Upon arriving at its destination or for other needed removal of the part from the packaging, the user need only cut open an edge of the lamination to expose the end of the parchment paper. The assembly is then easily openable allowing for easy part retrieval and a non-stick environment within the laminate. It is also within the scope of the invention to include a perforation, easy open tab or other laminate opening method in accordance with methods known or to be developed in the art.

The invention is most useful for very thin, easily damaged, fragile parts with surfaces prone to denting, kinking, bending, creasing, smudging, fingerprint markings, or other surface disruptions that can damage the intended purpose or function of the part. One preferred exemplary part is a gasket made from QPad 2 material that is an aluminum foil, having a thickness of about 0.001 to about 0.005 inches and a coating of graphite of about 0.0005 to about 0.003 inches applied to both sides of the foil. The resulting gasket material has a thickness of about 0.002 to about 0.010 inches and due to the graphite coating is easily smudged. Further, due to the aluminum foil interior it is easily kinked or creased. This type of damage affects the performance of the material in its intended application. Such gaskets can be used in semiconductor processing equipment such as within plasma and chemical vapor deposition reactors.

One significant advantage of the invention in the semiconductor and other industries where cleanliness is important is the sealed nature of the packaging which keeps the contents clean (and/or cleanroom ready and/or sterilized). The invention includes the ability to make parts "cleanroom" ready. The parts can then be transported from a first location to a second location while maintaining the clean nature of the part and avoiding damage.

In prior art shipping methods, the packaging used, in addition to not being sufficiently protective, is generally not prepared for cleanroom standards. The packaging described herein can be prepared in a first location having a clean environment. As used herein "clean" means that the environment is cleaner than standard manufacturing conditions. In a preferred embodiment, the environment may be substantially clean (meaning that few if any indication of debris or contamination is present), and most preferred, the environment can be at a level of "cleanroom" standards which are known in the art. Thus, the packaging can be used to assemble a packaged part in a clean, highly sterile and/or cleanroom environment such that such standards are sealed within the packaging.

After transporting to a second location, such as by hand, mail, plane, truck, ship, railcar or any other form of transportation of goods, the packaging can be wiped down easily with water and/or a mild soap or solvent to remove debris and contamination and then opened in a clean, substantially clean or sterile environment, or a cleanroom environment, since the inside of the packaging has been sealed within the packaging and is easily and readily removable. Such an advantage is also of significance for packaging parts that are thin and/or fragile for shipment in the pharmaceutical, medical, aerospace and other environments where cleanliness is important, and where such parts typically can be damaged in shipment. It also helps to replace bulky packaging for smaller, fragile parts so that more can be shipped in one package making shipping more economical. If desired for high sterility purposes, the packaging can be optionally formed with a laminatable material and inside contents which are of sufficiently high melting point that they can be sterilized using any gas and/or heat sterilization method in order to sterilize the packaging prior to introducing it into a similar environment.

Other materials that are thin and easily damaged but require precise geometry for critical applications and that can benefit from the method described herein, include, but are not limited to, polymers, metals, elastomers, or fabrics.

The invention also includes within its scope any packaging formed according to the invention. Such packaging can include the laminated structures described above enclosing a part such as described herein.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of laminating a thin fragile part, comprising
(a) preparing a laminatable assembly, comprising
   (i) providing a first sheet of laminatable material having a first surface, a second surface and a peripheral edge;
   (ii) contacting the second surface of the first sheet of laminatable material formed of a heat-laminatable material with a first surface of a non-stick layer formed of a non-stick material selected from non-stick polymer-impregnated film and parchment;
   (iii) placing a thin fragile part to be packaged on a second surface of the first non-stick layer opposite the first surface of the non-stick layer such that a first surface of the thin fragile part contacts the second surface of the non-stick layer;
   (iv) contacting a second surface of the thin fragile part opposite the first surface of the thin fragile part with a first surface of a second non-stick layer formed of a non-stick material; and
   (v) providing a second sheet of laminatable material formed of a heat-laminatable material having a first surface, a second surface and a peripheral edge, such that the peripheral edge of the first sheet of laminatable material is generally aligned with the peripheral edge of the second sheet of laminatable material to form the laminatable assembly having the first sheet and the second sheet of laminatable material as outer surfaces thereof; and
(b) laminating at least the peripheral edges of the first and second sheets of laminatable material to form a laminated package enclosing the thin fragile part.

2. The method according to claim 1, wherein the first and second sheets of laminatable material comprise a polyester, polyvinylchloride, fluoropolymeric material, olefinic material or combinations and copolymers thereof.

3. The method according to claim 1, wherein the first and second non-stick layers comprise a polymer-impregnated material.

4. The method according to claim 1, wherein the non-stick material is a silicone-impregnated parchment.

5. The method according to claim 1, wherein the thin fragile part is a gasket.

6. The method according to claim 5, wherein the gasket is a metallic foil gasket.

7. The method according to claim 6, wherein the metallic foil gasket is coated with graphite.

8. The method according to claim 6, wherein the gasket has a thickness of about 0.002 to about 0.010.

9. The method according to claim 1, wherein after step (a)(iv), step (a) further comprises
providing a second part such that a first surface of the second part contacts a second surface of the second non-stick layer; and providing a third non-stick layer such that a first surface of the third non-stick layer contacts a second surface of the second part opposite the first surface of the second part.

10. The method according to claim 1, wherein step (a) is repeated to form a second laminatable assembly and step (b) further comprises laminating the outer peripheral edges of the first and the second laminatable sheets of each of the first and the second laminatable assemblies.

11. The method according to claim 1, wherein step (b) further comprises laminating the first and the second laminatable sheets along their entire surface area.

12. The method according to claim 1, wherein step (b) is carried out at about 225° F. and about 275° F. for a sufficient time to laminate the peripheral edges.

* * * * *

UNITED STATES PATENT AND TRADEMARK OFFICE
CERTIFICATE OF CORRECTION

| | | |
|---|---|---|
| PATENT NO. | : 8,763,351 B2 | Page 1 of 1 |
| APPLICATION NO. | : 12/214483 | |
| DATED | : July 1, 2014 | |
| INVENTOR(S) | : Corrado | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1068 days.

Signed and Sealed this
Seventeenth Day of November, 2015

Michelle K. Lee
*Director of the United States Patent and Trademark Office*